United States Patent [19]
Karras

[11] 3,831,107
[45] Aug. 20, 1974

[54] CESIUM QUENCHED COPPER LASER

[75] Inventor: Thomas W. Karras, Berwyn, Pa.

[73] Assignee: General Electric Company, New York, N.Y.

[22] Filed: Mar. 21, 1973

[21] Appl. No.: 343,381

[52] U.S. Cl. .............................. 331/94.5, 330/4.3
[51] Int. Cl. ............................................. H01s 3/22
[58] Field of Search ............... 331/94.5; 330/4.3

[56] References Cited
UNITED STATES PATENTS

| | | | |
|---|---|---|---|
| 3,562,662 | 2/1971 | Gould et al. | 331/94.5 |
| 3,576,500 | 4/1973 | Gould et al. | 331/94.5 |
| 3,719,899 | 3/1973 | Breaux | 331/94.5 |

Primary Examiner—William L. Sikes
Attorney, Agent, or Firm—Henry W. Kaufmann; Allen E. Amgott; Raymond H. Quist

[57] ABSTRACT

Laser employing copper vapor as lasing gas is provided with small proportion (e.g., 5 percent) of cesium atoms, and operated in pulsed mode. Cesium atoms, while ionized by discharge, return very rapidly to ground state at its termination. Cesium first excitation energy from ground state is very nearly equal to energy of metastable lower lasing state of copper, which cesium at ground state will rapidly remove, preparing copper to be reexcited to upper lasing state at next pulse of exciting energy.

2 Claims, 3 Drawing Figures

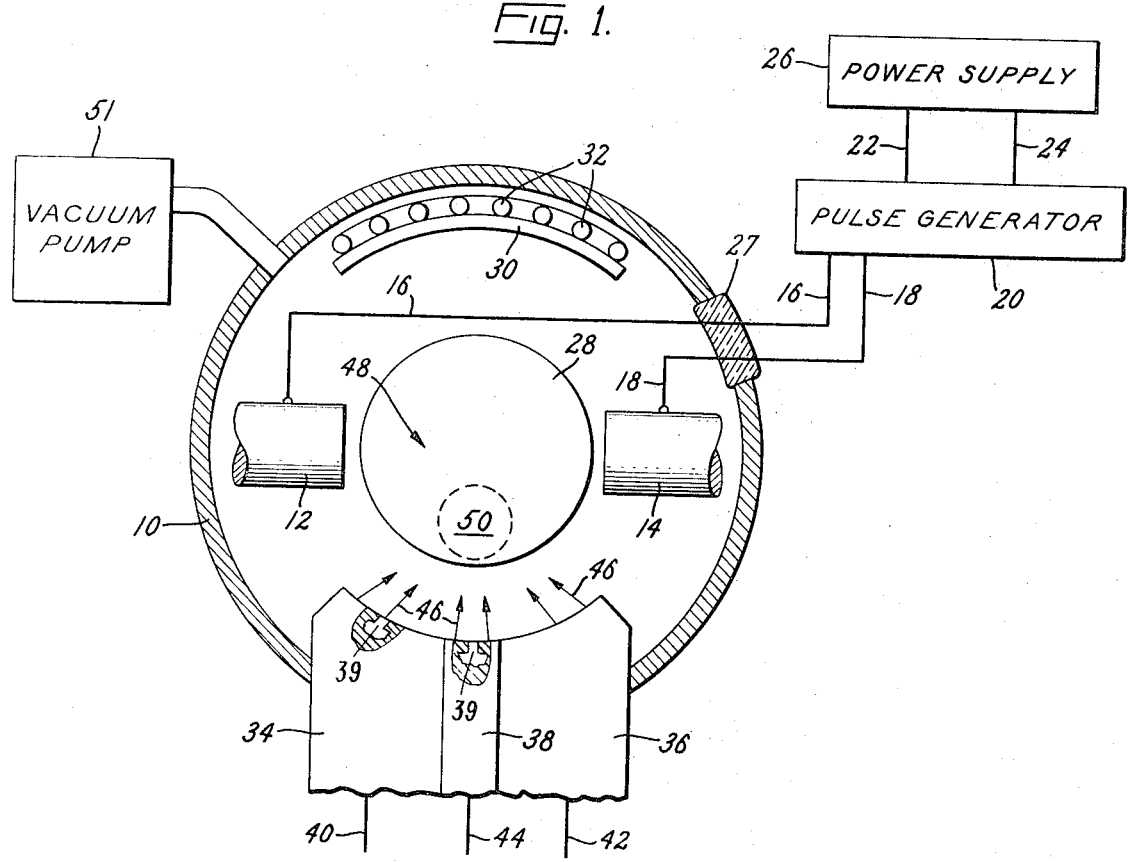
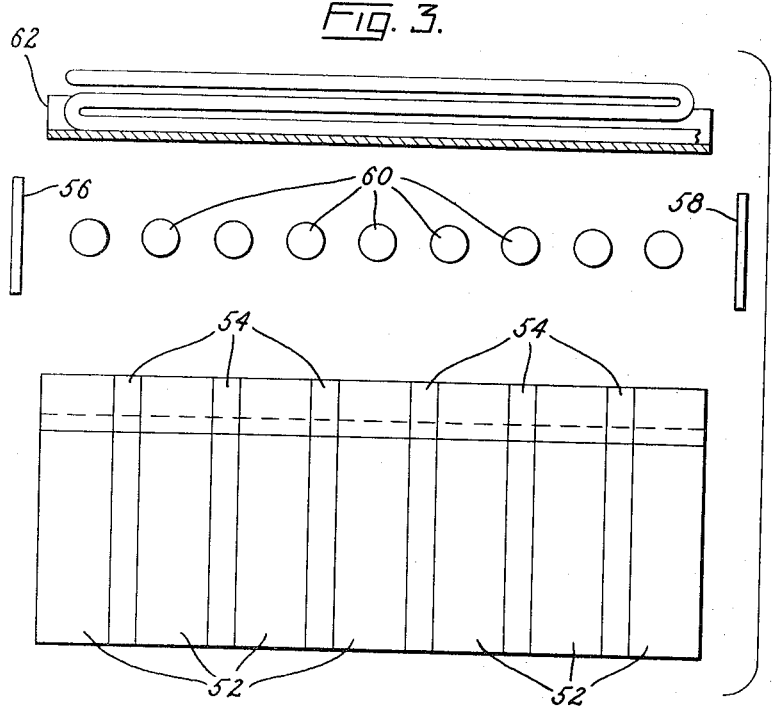

3,831,107

CESIUM QUENCHED COPPER LASER

CROSS-REFERENCE TO COPENDING APPLICATION

FLOWING VAPOR HIGH POWER LASER, Thomas W. Karras, assigned to General Electric Co., filed simultaneously with this application, Ser. No. 343,417, filed Mar. 21, 1973.

BACKGROUND OF THE INVENTION

1. Field of the Invention:

This invention pertains to self-quenching lasers, and more particularly to metal vapor lasers employing copper.

2. Description of the Prior Art:

The desirability of rapidly terminating the metastable lower lasing state of lasing vapor is well recognized; and the possibility of achieving this by selecting working materials, such as the alkaline earth metals, whose lower lasing level is close to their ground level, has been taught by Walter, U.S. Pat. No. 3,484,720. Copper, however, does not fall in this class. Gould et al., U.S. Pat. No. 3,562,662 teach a somewhat similar mode of operation using other metals and gases, but restrict their teaching to reduction of the metastable population by nearby levels in atoms of the same gas as the lasing gas.

SUMMARY OF THE INVENTION

Copper vapor is provided between electrodes which are pulsed intermittently to excite it and cause it to lase. With the copper vapor there is admixed a small proportion (e.g., 5 atomic percent) of cesium vapor which is also excited by the electrical discharge. Cesium decays to the ground state with a mean time of 14 nanoseconds, and so will return to the ground state very quickly after termination of the discharge. The excitation energy of the first resonance state of cesium is within 3 millielectron volts of the energy level of the lower, metastable laser state of copper. Consequently it has a very large cross section for collision with energy transfer from the metastable copper atoms, which it thereby renders ready to be excited to their higher lasing state by the next discharge. The energy acquired by the cesium atoms will tend to be radiated, possibly by lasing among the cesium atoms, in the red part of the spectrum, well away from the 5106 Angstrom radiation of the lasing copper and may thus be filtered out if it is objectionable, or used as part of the laser output if only energy rather than a particular wavelength is desired.

In the referenced copending application, it is taught how to provide copper vapor which flows through the interelectrode space so fast that the metastable copper atoms are swept away and replaced by fresh copper atoms. The use of the present invention may eliminate the need for such procedure except as a means of disposing of waste heat; but the general type of apparatus disclosed in the copending application is useful, with modifications, in the practice of the present invention. Cesium has a much lower boiling point than copper, and has a much higher vapor pressure than copper at any given temperature. Consequently, it is desirable to provide a source of copper vapor in which the high temperature required to provide an adequate density of copper vapor is confined to the copper source and the vapor pressure of any metallic cesium present is not in equilibrium with that high temperature. According to the referenced copending application, copper is heated in a confined space from which its vapor is expanded through nozzles or orifices by which its thermal energy is very largely converted to energy of translation, with a consequent reduction in its temperature. A suitable density of such copper vapor is $10^{17}$ atoms per cubic centimeter. Suitable cesium density in such copper vapor is of the order of $5 \times 10^{15}$ per cubic centimeter. The recombination and quenching operation in such a mixture will take less than a microsecond. Thus pulsing at a very high rate of the order of hundreds of kilohertz is possible by the use of my invention, with high efficiency. This contrasts with the limitations of prior art copper vapor lasers in which the relatively very long life of the metastable lower lasing state of the copper atoms renders such high-frequency pulsing highly inefficient to the point of being fruitless.

It is desirable to employ the general principle of maintaining a continuous flow of copper and cesium vapor through the lasing volume toward a cooled condensing surface, as taught in the referenced application, because this avoids the change in relative proportions of cesium and copper, which would occur if a noncirculating or closed system with cool windows, such as that described by Walter, were used. If this difficulty can be avoided, my invention will function equally well under such noncirculating conditions, but because of the limitations of a static laser described elsewhere I do not prefer it. Also, a modification of the apparatus I teach in the referenced copending application lends itself readily to controlled addition of cesium. This is simply the provision, in addition to the copper vaporizer there described, of a cesium vaporizer substantially similar in design, but provided with independent heating means which may be independently adjusted to provide the desired cesium flow. The two kinds of vaporizers must have their discharges so oriented that the issuing vapors of the two metals are adequately mixed before entering the lasing space. Because of the great volatility of cesium, it would also be possible to provide simply a cesium source connected to the apparatus, with means to maintain the laser at the proper temperature to provide the requisite vapor pressure of cesium; but this would require some precautions to insure uniform mixing of the cesium vapor with the copper vapor, and is not the best mode I now contemplate for the practice of my invention. It must be recognized that the alternative modes I do not prefer may be in fact preferable for specific applications, in particular where their possible greater simplicity may be a dominant consideration. My preference is aimed especially at preserving desired conditions controllably during prolonged periods of operation.

It may be mentioned that the rapid quenching of metastable lower states permits higher efficiency in laser operation by minimizing the dissipation of energy either as incoherent radiation or thermal agitation. In accordance with the usual principles governing energy-transforming apparatus, increase in efficiency may be expected to permit operation of a given apparatus at higher power levels than would be possible at lower efficiencies. Furthermore, since this quenching of the lower laser state could occur in times small compared to the flow time of the gas out of the laser cavity, an increase in repetition rate and higher average power could be realized.

DESCRIPTION OF THE PREFERRED EMBODIMENT

FIG. 1 represents schematically an arrangement of apparatus suited to the practice of my invention. An envelope 10 encloses hermetically electrodes 12 and 14, opposed to each other, and connected respectively by conductors 16 and 18 to pulse generator 20, which is in turn connected by conductors 22 and 24 to power supply 26. Since the representation of envelope 10 is purely symbolic, the sealing of conductors 16 and 18 through it is represented equally symbolically by insulating bushing 27 and electrodes 12 and 14 are represented only partially. It will be observed that conductor 16 is represented as carried internally, but behind the lasing volume (or discharge gap) 48 directly between electrodes 12 and 14 so that it will be outside of the discharge between them, to the vicinity of conductor 18 so that the two conductors 16 and 18 may be led close together in order that they will present relatively low inductance, or more elegantly they may be so spaced that they constitute a transmission line of uniform surge impedance matched to the resistance of the discharge between electrodes 12 and 14. In practice the design of envelope 10, and the size and mode of mounting electrodes 12 and 14 will be determined in large part by the powers and discharge rise time contemplated and the requirements for cooling the electrodes. It may be noted that though refractory metals such as Ta, W, or Mo will generally be used, copper may be a satisfactory material for them, since neither their erosion nor deposition of copper upon them from the working substance will alter their composition. A reflector 28 is represented to show one-half of the conventional two-reflector optical regenerative system conventional in lasers, sectioning of the figure having eliminated the other half. Reference 30 is a metal condenser, adapted to be cooled by cooling liquid circulated through cooling tubes 32 in good thermal contact, as by welding or brazing, with the back of 30.

Sealed hermetically into envelope 10 are copper vapor sources 34 and 36, which are similar to vaporizers described in more detail in my referenced copending application, to which reference is made for more complete description. copper vapor sources 34 and 36 are hermetically sealed to cesium vapor source 38. All of these sources comprise electrically heated containers provided at the top with covers having capillary apertures or nozzles or, generically, vapor directive means 39, which discharge generally along the directions indicated by arrows 46 toward interelectrode lasing volume 48. Conductors 40, 42, 44 are connected respectively to the heaters of vapor sources 34, 36, and 38, and to separately controllable energy sources, completely conventional and hence not shown. Sources 34 and 36 contain copper metal, and 38 contains cesium. By suitably adjusting the energy supplied via conductors 40, 42, and 44, the rate of flow of copper vapor and of cesium vapor may be suitably adjusted to produce operative concentrations, such as those already specified. The arrows 46 all point to the dashed volume 50, in which mixing of the cesium and copper will occur, after which the mixture will move into lasing volume 48 between electrodes 12 and 14, where it will be excited and, by optical regeneration via reflector 28 and another reflector not shown because it has been cut off by the sectioning, will lase when a pulse is applied by pulse generator 20. After lasing has occurred, the pulse from generator 20 will terminate, the copper atoms will be returned from the metastable lower state to the ground state, by interaction with the cesium atoms as previously described, and a new pulse may be applied by pulse generator 20. Because of the expedited destruction of metastable copper atoms, this cycle may be repeated a number of times before the mixed vapors reach and are condensed on condenser 30, which is kept cooled by flow of a coolant, from a conventional source not shown, through tubes 32.

Since the interior of the laser must be evacuated of air prior to operation, and it is desirable to provide for removal of any foreign gases released from molten metals or interior parts, a vacuum pump 51 is represented schematically connected to perform this function.

FIGS. 2 and 3 represent very schematically, in profile and elevation respectively, an alternative, possibly superior arrangement of copper and cesium vapor sources. Profile 52 represents a copper vapor source unit shaped in profile substantially like the combination of vapor sources 34, 36, and 38. FIG. 3 represents a plurality of such copper vapor source units 52 alternated with cesium vapor source units 54 of similar profile, but narrower in view of the smaller requirement for cesium. Clearly an array of vapor source units such as is represented by FIG. 3 will provide a long path from which mixed copper and cesium vapor will arise. The reflectors 56 and 58 of the optical regenerative system will lie at left and right of the assembly represented by FIG. 3; either elongated electrodes similar to 12 and 14 will extend, opposed, above that long path; or, a plurality of pairs of electrodes 60 such as 12 and 14, opposed to each other, will extend in a line along the vapor source path. An equivalent 62 of condenser 30 will extend above the array of sources 52 and 54. The intermingling of copper vapor source units 52 and cesium vapor source units 54 may be done on as fine a scale as may be necessary to insure mixing of the two kinds of vapors and will in practice be finer than represented in FIG. 3 where the number of source units has been made small for better representation on the available scale. As an extreme simplification, not preferred, the perforated covers of cesium source units 54 may be omitted, so that the cesium vapor simply boils out.

The vacuum-tight envelope of the embodiment of FIG. 3, and the conductors to the various vapor source units and to the electrodes have been omitted, for simplicity, being conventional.

The essence of my teaching is the increase of the efficiency of a copper vapor laser by the use of cesium to de-excite the metastable "lased" atoms and to permit the repeated efficient rapid pulsing of the exciting means.

In its simplest embodiment, this may be described as the addition of a source of cesium vapor to provide cesium vapor in a laser made up of a source of copper vapor and a lasing volume with exciting electrodes to produce a field in the lasing volume, and electrical discharge means, i.e., a pulse generator or the like, connected to the electrodes. While the conventional optical regeneration means (in the simplest form, a total reflector and a partial reflector opposed) will ordinarily be desired to provide direction to the laser radiation, lasing in the vapor combination I describe is possible without it. A particular form of the general embodiment has cesium and copper vapor source units located in alternation with each other, e.g., as represented in FIG. 3. That same figure also exemplifies copper and cesium sources which direct the respective vapors into the lasing volume. Further, while I have recognized the possibility of operation with a closed or non-flowing system, I have expressed the reasons for my preference of a system in which the copper and cesium vapor sources are adapted to continuously produce their respective vapors, and means are provided to condense the vapors at the same rate as they are produced, in order that their relative proportions may not vary. Since metal vaporizing means are known which are capable of producing intermittent metered puffs of vapor, which may be done at such a high rate as to constitute substantially a continuous flow (e.g., U.S. Pat. Nos. 3,350,885 and 3,400,241) the term "continuously" will be recognized as subsuming continual vaporization at such a rate as to produce the effect of continuous vaporization. Quite apart from the specific apparatus I have taught, I have also taught the general method of improving the operation of any copper vapor laser in which copper atoms in the ground state are excited to an upper lasing state from which they descend to a lower metastable state, by providing cesium vapor mixed with the copper vapor.

What is claim is:

1. In a laser structure comprising:
   an evacuable envelope;
   a plurality of electrodes each separated from another by a discharge gap;
   reflector means for reflecting back through each discharge gap radiation originating in the gap;
   electrical discharge means connected to electrodes separated from each other by a discharge gap;
   the improvement comprising the combination therewith of:
   a source of copper vapor comprising a container for metallic copper, heating means to heat the copper to vaporize it, and copper vapor directive means to direct the copper vapor thus produced through a discharge gap;
   a source of cesium vapor comprising a container for metallic cesium, heating means to heat the cesium to vaporize it, and cesium vapor directive means to direct the cesium vapor thus produced through a discharge gap through which copper vapor is also directed.

2. The improvement claimed in claim 1 further comprising:
   cooled vapor condensation means opposed to the said source of copper vapor and to the said source of cesium vapor, located farther from each vapor source than the gap through which that vapor source discharges its vapor.

* * * * *